United States Patent [19]

Hungerford, Jr.

[11] Patent Number: 4,763,867

[45] Date of Patent: Aug. 16, 1988

[54] BRACKET FOR HOLDING PIPE CLAMPS

[76] Inventor: Charles S. Hungerford, Jr., 6 Beechwood Ct., Woodbury, Conn. 06798

[21] Appl. No.: 59,494

[22] Filed: Jun. 8, 1987

[51] Int. Cl.$^4$ ............................................... F16L 3/08
[52] U.S. Cl. .................................. 248/544; 248/316.7; 248/500; 24/458
[58] Field of Search ................. 248/544, 65, 68.1, 301, 248/304, 305, 316.7, 500; 24/458, 532

[56] References Cited

U.S. PATENT DOCUMENTS

| | | | |
|---|---|---|---|
| 105,794 | 7/1870 | Freets | 248/500 |
| 436,600 | 9/1890 | Hartman | 248/316.7 |
| 1,704,075 | 3/1929 | Brown | 24/458 |
| 2,077,316 | 4/1937 | Geib | 248/301 |
| 2,208,722 | 7/1940 | Doty | 24/293 |
| 2,632,451 | 3/1953 | Redo | 248/305 |
| 3,027,128 | 3/1962 | Liberty | 248/544 |
| 3,124,327 | 3/1964 | Meszaros | 248/304 |
| 3,231,951 | 2/1966 | DeArmond | 248/316.7 |
| 3,471,109 | 10/1969 | Meyer | 248/68.1 |
| 3,489,288 | 1/1970 | McDaniel | 248/301 |
| 3,802,655 | 4/1974 | Schuplin | 248/62 |
| 4,291,855 | 9/1981 | Schenkel | 24/339 |

FOREIGN PATENT DOCUMENTS 1180888  6/1959  France ..................... 248/500

Primary Examiner—J. Franklin Foss
Assistant Examiner—Robert A. Olson
Attorney, Agent, or Firm—Bachman & LaPointe

[57] ABSTRACT

The present invention relates to a bracket for holding one or more clamps for supporting one or more tubular members such as pipes, conduits or cables. The bracket comprises a substantially planar base portion having a plurality of spring elements joined thereto with each spring element being capable of engaging a slotted portion of a pipe clamp. Each spring element includes a corrugated portion for forming a snug fit with the slotted portion of the clamp and a notched tip portion for receiving a tool for assisting in moving the spring element relative to the strip.

16 Claims, 1 Drawing Sheet

BRACKET FOR HOLDING PIPE CLAMPS

CROSS REFERENCE TO RELATED APPLICATIONS

This application is related to allowed U.S. patent application Ser. No. 859,332, filed May 5, 1986, to Charles S. Hungerford, Jr. for a Connector Device For Supporting A Conduit In A Flanged Channel; U.S. patent application Ser. No. 882,780, filed July 7, 1986, to Charles S. Hungerford, Jr. for a Pipe Clamp For Connecting With A Wooden Joist Or Other Frame Member; U.S. patent application Ser. No. 886,411, filed July 17, 1986, to Charles S. Hungerford, Jr. for a Hanger For A Pipe Clamp; and U.S. patent application Ser. No. 059,495, filed June 8, 1987, to Charles S. Hungerford, Jr. for an Improved Mounting Arrangement For A Pipe Clamp Holder (Attorney's Docket No. 87-190).

BACKGROUND OF THE INVENTION

The present invention relates to a bracket for holding one or more clamps for supporting one or more tubular members such as pipes, conduits or cables.

A variety of techniques are employed in modern houses and buildings to support pipes or conduits used as oxygen lines, vent lines, and water supplies for urinals, flush valve water closets, sinks and heaters. One common support device is a bracket having a series of holes for receiving the pipe(s) or conduits(s). The bracket is usually an all metal construction such as copper-coated steel. It can be secured to structural elements by screw, bolt or nail fasteners. In order to accommodate different sized pipes or conduits, the holes in the brackets have different diameters. In some installations, a plastic insert is first placed about the pipe and then snapped into engagement with one of the holes in the support bracket. The plastic insert helps minimize sound transfer and provides noise and physical insulation. The main disadvantage of these brackets is their inability to readily accommodate pipes of all sizes.

Another commonly used device is a single pipe clamp or hanger having a mounting member or bracket associated therewith. The clamp or hanger is typically secured to a structural support such as a wooden beam or a joist by inserting a fastener through the mounting member. U.S. Pat. No. 3,802,655 to Schulpin illustrates one such pipe hanger. The Schulpin hanger has integrally formed ears with holes for receiving the fastener(s) for securing the hanger to the support. U.K. Patent Application Ser. No. 2,130,077A to Wavin BV illustrates a similar hanger having a mounting member capable of rotation relative to the hanger. The primary deficiency of these devices is the fact that they can only support a single pipe, conduit or cable.

SUMMARY OF THE INVENTION

Accordingly, it is an object of the present invention to provide a bracket capable of holding one or more tubular members.

It is a further object of the present invention to provide a bracket capable of holding a tubular member having any desired size or diameter.

It is still a further object of the present invention to provide a bracket as above which is relatively simple to design, economical to manufacture, and easy to use.

These and other objects and advantages will become more apparent from the following description and drawings in which like reference numerals depict like elements.

The present invention relates to a bracket for holding one or more clamps for supporting one or more tubular members. As used herein the phrase "tubular member" refers to a pipe, a conduit, a cable, or the like. The bracket comprises a substantially planar base portion having at least one spring element adapted to fit within a slot in a portion of the clamp. In order to obtain a secure fit between the bracket and the clamp, each spring element has a corrugated or ribbed portion. Each spring element further includes a notched portion for receiving a tool which assists in moving the spring element relative to the remainder of the bracket.

One of the advantages of the present invention is the ability to support with a single bracket, pipe clamps having different sizes for receiving pipes having different diameters. Other advantages include the ability to mount the bracket of the present invention to a wide variety of structural supports.

DETAILED DESCRIPTION OF THE INVENTION

Figure 1:
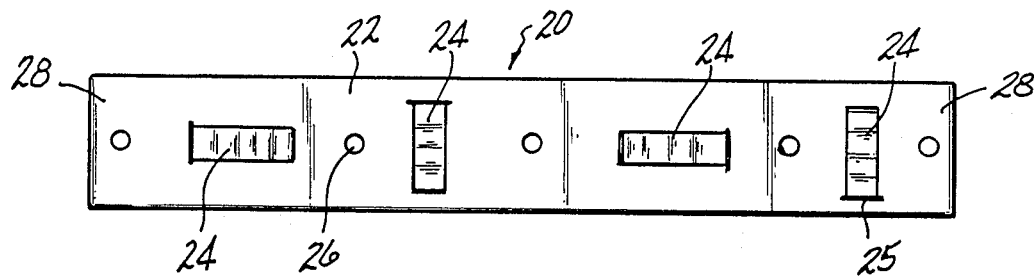
FIG. 1 is a front elevational view of the bracket of the present invention.
Figure 2:
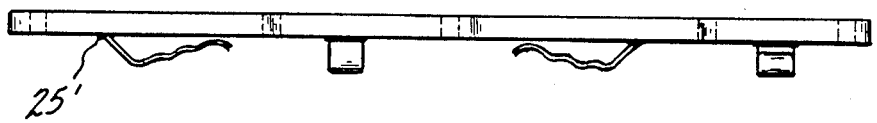
FIG. 2 is a top view of the bracket of FIG. 1.
Figure 3:
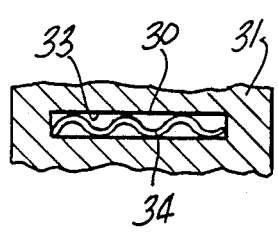
FIG. 3 is a cross sectional view illustrating the corrugated portion to one of the spring elements inserted within a slotted portion of a pipe clamp.
Figure 4:
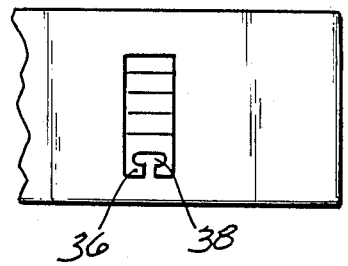
FIG. 4 illustrates the tip portion of one of the spring elements.

The present invention is directed to a bracket intended to be used with quick operating clamps for receiving and supporting pipes, cables and conduits. A typical quick operating clamp which can be used with the bracket of the present invention is shown in U.S. Pat. No. 4,291,855 to Schenkel et al., which is hereby incorporated by reference herein. This clamp is particularly advantageous because it has a slot in its base which is capable of receiving a support element such as a spring member. It should, of course, be recognized that the bracket of the present invention could be used with any clamp having a similar slotted construction.

Referring now to the Figures, the bracket 20 of the present invention has a substantially planar base portion 22 and a plurality of spring elements 24 such as spring clips. The base portion 22 may be formed from any suitable material known in the art. Preferably, it is formed from a metal or metal alloy such as copper, a copper alloy, aluminum, an aluminum alloy, iron, an iron alloy, or steel. If desired, the base 22 could be formed from copper-coated steel. The spring elements 24 may be formed from any suitable spring material known in the art and may be welded or otherwise joined along one edge to a portion of the base 22. Alternatively, the spring elements 24 may be formed integral with the base 22 such as by stamping. Preferably, each spring elements 24 is formed from the same material used to form the base 22.

The spring elements 24 are joined to the base 22 either along an edge 25 which runs substantially parallel to the longitudinal axis of the bracket 20 or along an edge $25^1$ which runs substantially perpendicular to the longitudinal axis of the bracket. When joined along the substantially parallel edge 25, the spring element will normally support a quick operating clamp not shown adapted to receive a tubular structure not shown having a longitudinal axis substantially perpendicular to the bracket longitudinal axis. When joined along a substantially perpendicular edge, the spring element will normally support a quick operating clamp adapted to receive a tubular structure whose longitudinal axis is substantially parallel to the bracket longitudinal axis.

Of course, the bracket 20 may have any desired number of spring elements 24 and the base 22 may have any desired length. While FIG. 1 illustrates a bracket having a series of spring elements having different orientations, the bracket 20 could be fabricated to have a plurality of spring elements with the same orientation and/or joined to the base portion along the same edge.

If desired, the base portion 22 could be formed from a plurality of telescoping members each having one or more spring elements.

The bracket 20 also has a plurality of apertures 26 for permitting it to be mounted to a support structure such as a beam or a joist. Any suitable fastener known in the art such as screws, bolts, masonry nails, ordinary nails, or power driven fasteners may be used to secure the bracket 20 to a support structure via apertures 26. If desired, the end portions 28 of the bracket may be fabricated in a way that permits them to be bent at an angle relative to the planar base portion 22. By providing such end portions, the bracket 20 may be supported between two structural members.

As previously discussed, a quick operating clamp is mounted to the bracket 20 by inserting one of the spring elements 24 into a slot 30 in a portion 31, usually the base, of the clamp. Preferably, the portion 31 is held flat or square against the base 22 by the spring element. Since it is desirable to have a tight fit between the spring element 24 and the sidewalls 33 of the slot 30, each spring element 24 is provided with a corrugated or ribbed portion 34 which contacts the slot sidewalls at a number of spaced locations.

In order to mount a clamp on a spring element, it is often necessary to pry the spring element away from the base 22. To this end, each spring element 24 is further provided with a notched tip portion 36 for receiving a portion of a tool not shown such as a claw on a hammer or the tip of a screw driver. Insertion of the tool in the notch permits the element 24 to be moved relative to the base 22. The notch 38 in the tip portion 36 may have any desired configuration.

In operation, the bracket of the present invention is secured to a support structure not shown. One or more clamps for supporting pipes, conduits or other tubular members having a desired size are then mounted to the bracket by inserting one of the spring elements 24 into the slot 30 in the clamp. If needed, the spring element(s) may first be moved relative to the bracket 20 by inserting a tool into the notch 38 in the element's tip. Thereafter, the pipe(s) or tubular member(s) to be supported are inserted within the clamp(s) and secured in position.

The bracket 20 of the present invention is capable of holding a plurality of different sized clamps not shown for supporting a plurality of different sized pipes or tubular members. In addition, the bracket 20 can be used with a wide variety of clamps as long as the clamp has a slot for engaging or receiving the spring elements.

The U.S. Patents and foreign patent publication discussed in the specification are intended to be incorporated by reference herein.

It is apparent that there has been provided in accordance with this invention a bracket for holding pipe clamps which fully satisfies the objects, means and advantages set forth hereinbefore. While the invention has been described in combination with specific embodiments thereof, it is evident that many alternatives, modifications and variations will be apparent to those skilled in the art in light of the foregoing description. Accordingly, it is intended to embrace all such alternatives, modifications and variations as fall within the spirit and broad scope of the appended claims.

What is claimed is:

1. A bracket for holding at least one clamp used to receive and support at least one tubular member comprising a substantially planar base portion and at least one spring element joined to said base portion and having a free end, said at least one spring element having a first notched portion for receiving a tool for assisting in moving said spring element relative to said base portion for receiving a clamp and a second corrugated portion for holding said clamp against said base portion.

2. A bracket according to claim 1 wherein each said spring element is joined along an edge to said base portion.

3. A bracket according to claim 1 wherein each said spring element comprises a spring clip.

4. A bracket according to claim 1 wherein said base portion is formed from metal or a metal alloy and said at least one spring element is welded thereto.

5. A bracket according to claim 1 wherein said base portion and each said spring element are formed from a metal or metal alloy and each said spring element is integrally formed with said base portion.

6. A bracket according to claim 1 further including means for attaching said bracket to at least one support structure.

7. A bracket according to claim 6 wherein said attaching means comprises a plurality of apertures for receiving at least one fastening device.

8. A bracket according to claim 1 wherein said bracket has a longitudinal axis and each said spring element is oriented to support a tubular member having its longitudinal axis substantially perpendicular to said bracket longitudinal axis.

9. A bracket according to claim 1 wherein said bracket has a longitudinal axis and each said spring element is oriented to support a tubular member having its longitudinal axis substantially parallel to said bracket longitudinal axis.

10. A bracket according to claim 1 wherein said corrugated portion is between said notched portion and where said spring element is joined to said base portion.

11. A bracket according to claim 10 wherein said notched portion is provided on said free end of said at least one spring element and said corrugated portion is adjacent said notched portion.

12. A bracket according to claim 11 further comprising a plurality of spring elements oriented at different positions for holding a plurality of clamps for supporting a plurality of tubular structures.

13. A bracket according to claim 1 wherein said notched portion is provided on said free end of said at least one spring element and said corrugated portion is adjacent said notched portion.

14. A bracket and pipe clamp assembly for supporting a tubular member comprises a bracket having a substantially planar base portion and at least one spring element joined to said base portion and having a free end, a pipe clamp having a base portion and a slot adapted to receive said at least one spring element, said at least one spring element having a first notched portion for receiving a tool for assisting in moving said spring element relative to said base portion for inserting said spring element into said slot of said clamp and a second corrugated portion received in said slot for holding said clamp against said base portion of the bracket.

15. A bracket according to claim 14 wherein said corrugated portion is between said notched portion and where said spring element is joined to said base portion.

16. A bracket according to claim 15 wherein said notched portion is provided on said free end of said at least one spring element and said corrugated portion is adjacent said notched portion.

* * * * *